(12) United States Patent
Kilpatrick

(10) Patent No.: US 6,367,825 B1
(45) Date of Patent: Apr. 9, 2002

(54) ADJUSTABLE KINGPIN BOSS

(75) Inventor: Tisha Cole Kilpatrick, Hendersonville, NC (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/699,810

(22) Filed: Oct. 30, 2000

(51) Int. Cl.⁷ .............................................. B62D 17/00
(52) U.S. Cl. ................ 280/86.75; 280/93.512
(58) Field of Search ............ 280/93.512, 124.127, 280/86.75, 86.751, 86.754

(56) References Cited

U.S. PATENT DOCUMENTS

| | | | | |
|---|---|---|---|---|
| 807,832 A | * | 12/1905 | Lindsay | |
| 1,932,340 A | * | 10/1933 | Goltry | |
| 1,946,738 A | * | 2/1934 | Gulan et al. | |
| 2,187,249 A | * | 1/1940 | Schatz | |
| 4,243,339 A | * | 1/1981 | Dickerson | |
| 4,693,487 A | * | 9/1987 | Cooper | |
| 5,219,176 A | * | 6/1993 | Mitchell | |

* cited by examiner

*Primary Examiner*—Paul N. Dickson
(74) *Attorney, Agent, or Firm*—Carlson, Gaskey & Olds, PC

(57) ABSTRACT

An improved steering assembly incorporates an adjustably mounted lower boss in a steering knuckle. The lower boss can be positioned at any of a variety of locations relative to a rotational axis of the wheel mounted on the knuckle. This allows adjustment of the distance between an I-beam spring pad and the rotational axis for the wheel hub. In this way, the present invention eliminates the necessity to have a number of different I-beam configurations. Preferably, the lower boss is bolted to a flange on the steering knuckle. Further, the upper boss may also be removably mounted to the steering knuckle such that the distance between a steering arm connection and the spring pad may also be adjusted.

15 Claims, 2 Drawing Sheets

ADJUSTABLE KINGPIN BOSS

BACKGROUND OF THE INVENTION

This invention relates to a unique steering knuckle for a heavy vehicle steering system wherein the relative position of the kingpin boss and the other steering components is adjustable.

Heavy vehicle steering systems typically include a pair of wheel end assemblies on the steering axle. The wheel end assemblies are mounted on the knuckle, which includes two bosses mounted onto a kingpin. A lower boss is spaced from an upper boss. The standard structure available today includes a one-piece steering knuckle combined with the upper and lower bosses. There is no adjustability. An I-beam extends across the vehicle, and is positioned between the upper and lower boss, and also about the kingpin at each end. The two lower bosses are connected to a tie rod, and the two upper bosses are connected to a steering arm. Current steering systems utilize the kingpin bosses to allow rotation of the knuckle and wheel end assembly about the kingpin, thus resulting in steering of the vehicle.

There are a number of dimensional differences between the steering systems on different vehicles. As one example, the I-beam has a drop dimension along its length. There are a number of different drops requested by heavy vehicle manufacturers for the I-beam. The drop could be characterized as the distance between the spring pad of the I-beam and the rotational axis of the wheel on the wheel hub. The requests for different drops have resulted in a need for a large number of different I-beam forgings. Further, as the I-beam drop is increased, a cross tube, which is a portion of the steering assembly connected into the tie rod assembly, may also be in interference with the spring pad, oil pan and/or other vehicle components.

As another example, the steering arm which is connected to the upper kingpin boss is also desirably spaced at a variety of different dimensional spacings relative to the spring pad in different vehicles. That is, vehicles manufacturers would like to have freedom in selecting different distances between the steering arm and the spring pad. However, the present structures have not provided any such variation. Instead, numerous steering arms have been constructed to provide the variation.

SUMMARY OF THE INVENTION

In a disclosed embodiment of this invention, at least the lower boss of a kingpin boss assembly is adjustable in its positioning relative to the rotational axis for the wheel hub. As the lower boss position is varied, the location of the I-beam and thus the resultant drop can also be varied. In this way, a number of different I-beam drops can be achieved with a single I-beam. The elimination of the requirement of making several different I-beams greatly reduces the expense and burden of manufacturing steering systems for heavy vehicles.

In a preferred embodiment of this invention, the boss may be connected to a flange of the steering knuckle in a variety of different methods after having been positioned at the desired location. In one embodiment, the lower boss may be welded. However, preferably, the lower boss is connected by bolting or other removable mechanisms. In this way, the lower boss can be removed from the knuckle such that a maintenance worker can service the axle components. In one type of front axle, there is a frozen kingpin design where the kingpin is press fit (shrink fit) into the I-beam. In such structure, assembly and maintenance on the combination of the knuckle and the I-beam is complex. The removable lower boss facilitates the assembly and disassembly of the steering assembly.

Preferably, once the vehicle design has been complete, the approximate location of the lower boss portion to achieve a desired drop is determined. In preferred embodiments, a bolt hole on the lower boss is positioned relative to the lower flange of the knuckle. At that time, a hole is drilled through the flange such that the lower boss will be properly positioned to the flange. This is then done as part of the final machining on the knuckle for the entire run of steering assemblies for that vehicle type. As the position of the lower boss moves relative to the flange, spacers may be positioned between the I-beam and the upper boss. Thus, different I-beam configurations are not necessary to achieve different drops.

In other embodiments, a plurality of bolt holes may be formed within the flange such that any one of several different locations can be selected, without having to machine the knuckles to be different for different vehicles. Further, the flanges could be formed with bolt hole slots which allow adjustment of the boss along the slots. Also, the lower boss can be simply welded at the desired location. However, most preferably, the single bolt hole which is machined for a desired position for the particular vehicle combination is preferred.

In another feature of this invention, the upper boss may also be removably mounted to the knuckle. In such an application, the boss may be mounted in any of the fashions described above. By adjustably mounting the upper boss, one can control the distance between the steering arm and the spring pad. There is a desire to have the ability to vary this distance, and to date, this desire has been accommodated by providing different steering arm constructions. By allowing adjustment of the upper boss, the need for a number of different steering arm configurations will be reduced.

These and other features of the present invention can be best understood from the following specification and drawings.

DETAILED DESCRIPTION OF A PREFERRED EMBODIMENT

Figure 1:
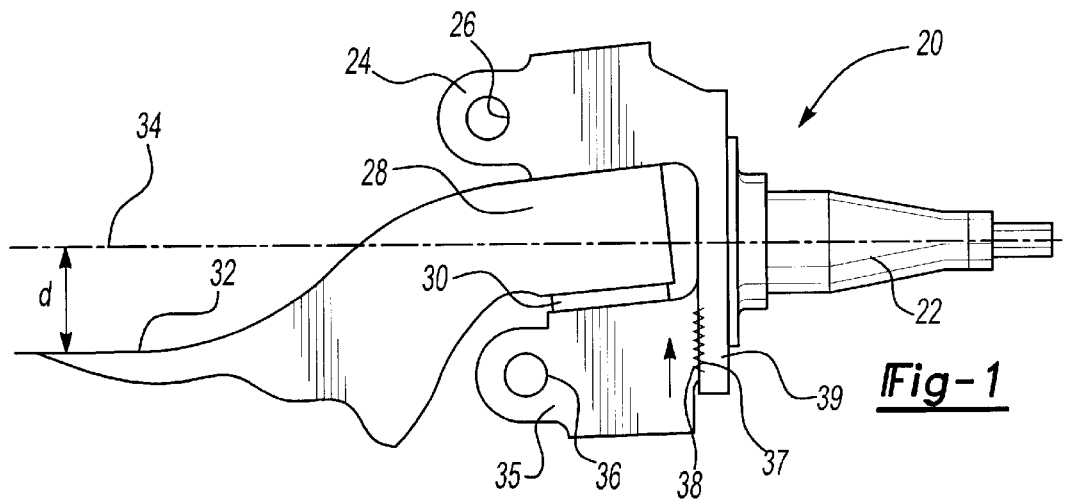
FIG. 1 shows a first positioning of the inventive kingpin assembly.

FIG. 1 shows a heavy vehicle steering assembly 20 incorporating a steering knuckle and spindle 22 having an upper boss 24 connected to a steering arm at 26. An I-beam 28 is mounted between the upper boss 24 and a thrust bearing 30. A surface 32 on the I-beam 28 is known as the spring pad of the I-beam. This is where the axle is mounted to the chassis. As shown, an axis 34 upon which the wheel assembly is mounted on the knuckle spindle is spaced from the spring beam by a vertical distance d. Vehicle manufacturers will vary this distance for a particular vehicle. It is dimension d which has required different configurations of I-beams in the past when the boss and knuckle combination have been non-adjustable. In the present invention, the lower boss 35 is adjustable relative to the knuckle 22. As shown, the lower boss 35 carries a connection to the tie rod shown at 36. A weld joint 37 is shown with the lower boss 35 position spaced vertically from a lower end 38 of a flange 39 of the knuckle 22. In this embodiment, the lower boss 35 is positioned to a desired vertical location, and then attached to the flange 39.

Figure 2:
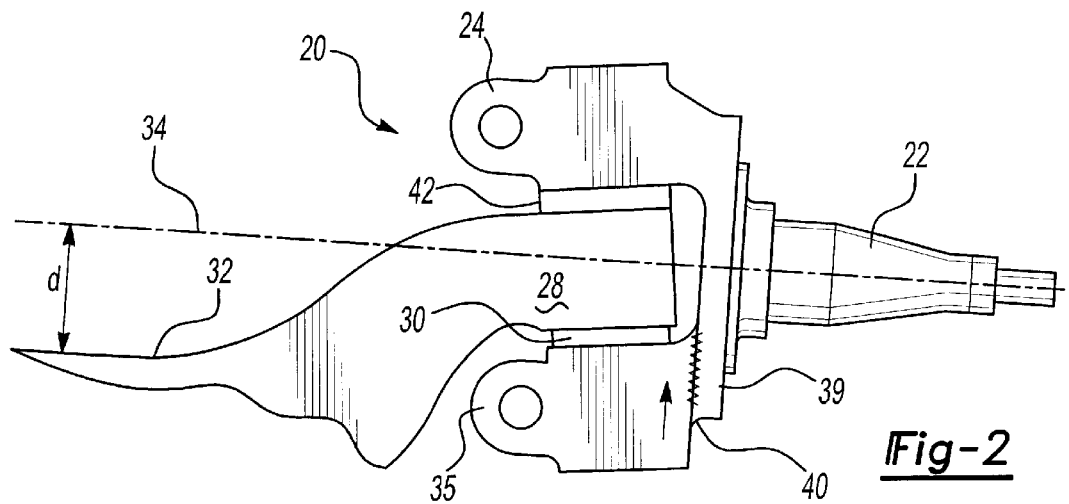
FIG. 2 shows a second positioning of the inventive kingpin assembly using a spacer.

However, for a different vehicle configuration such as shown in FIG. 2, the lower boss 35 is shown mounted at a much lower position 40 on the flange 39. In such a position, a spacer material 42 is positioned between an upper surface of the I-beam 28 and the upper boss 24. By changing the boss location, the distance d between the spring pad 32 and the axis 34 can be varied without requiring different I-beam configurations.

As is known, the steering system works generally with a steering force passing through the steering arm from the gear box to the upper boss 26, which causes one of the two knuckles 22 to turn. Wheels are mounted on the knuckles 22. Thus, the wheel is also turned. When one of the knuckles turns, the other wheel is turned through a connection through the tie rod shown at 36. It should be understood that the connections 26 and 36 are shown schematically, and can be generally as known in the art. Any type of connection to the steering arm and tie rod may be utilized.

Figure 3:
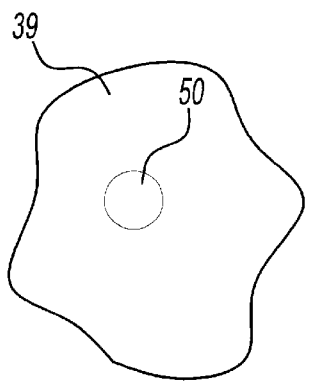
FIG. 3 shows one attachment method.

As shown in FIG. 3, rather than having a weld joint between the lower boss 35 and the flange 39 removable, connections such as a bolted connection 50 may be utilized. In this embodiment, once a particular vehicle configuration has been designed, the relative position of the lower boss 35 and the flange 39 can be determined. At that point, the desired location for the through bolt hole in the flange 39 can be determined, and can be made part of the final machining. The bolt hole 50 may then be drilled through the flange 39, and the lower boss 35 attached as appropriate.

Figure 4:
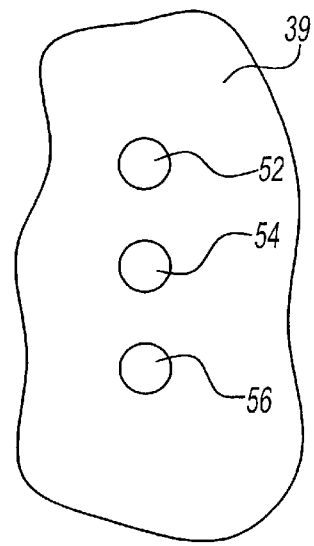
FIG. 4 shows an alternative attachment method.

FIG. 4 shows an embodiment wherein the flange 39 is formed with a plurality of spaced holes 52, 54 and 56. Any one of these holes can be selected for attachment of the lower boss 35 such that the position of the lower boss 35 can be varied.

Figure 5:
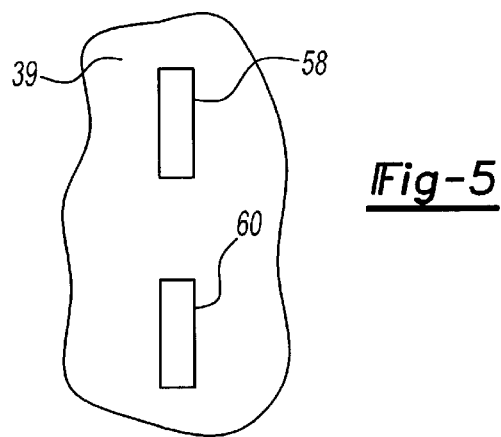
FIG. 5 shows yet another alternate attachment mechanism.

FIG. 5 shows yet another embodiment wherein the bolt holes 59 and 60 are slots such that the position of the lower boss 35 can be varied.

FIGS. 1 through 5 show a system wherein the lower boss 35 can be positioned at a variety of locations relative to the axis 34, and hence the distance between the spring pad 32 and the axis 34 can be varied.

Figure 6:
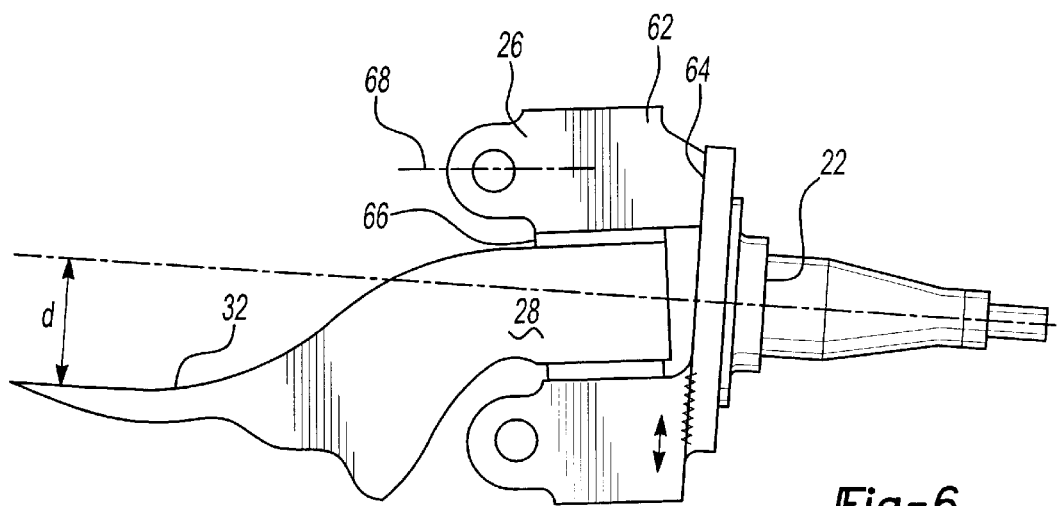
FIG. 6 shows another feature of the present invention.

FIG. 6 shows another embodiment 60 wherein the upper boss 62 is also adjustable relative to the upper flange 64. Any of the attachment methods described above may be utilized for attachment of this upper boss 62. As shown, by adjusting the position of the upper boss 62, the distance D between the steering arm 26, shown as an extended axis 68 and the spring pad 32 can be varied. Vehicle manufacturers also would like to have the ability to vary the distance D between the steering arm 26 attached at the spring pad 32, and by allowing the upper boss position to be adjusted, the variation of the distance D can be achieved without the requirement of distinct steering arms. As shown, with the double adjustment such as shown in FIG. 6, the amount of filler material 66 to achieve the same d distance will be less than that shown in the FIG. 2 embodiment.

Figure 7:
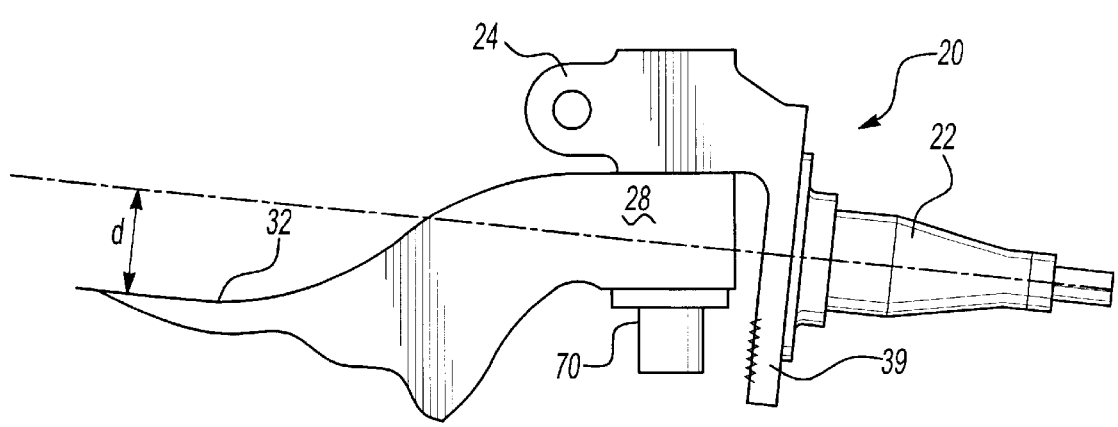
FIG. 7 shows an assembly feature of the present invention.
Figure 7:
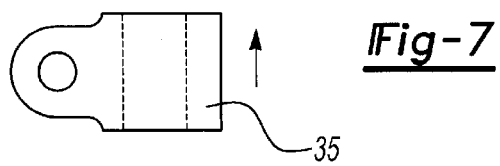

One further feature of this invention is shown in FIG. 7. Some I-beams are provided with a kingpin which is known as "frozen". This type kingpin is press fit into the I-beam 28. Such combinations have provided some challenges in removing the steering knuckle from the kingpin and I-beam. With the present invention, the lower boss may be removed exposing the kingpin 70. The kingpin 70 may then be lowered outwardly of the upper boss 24, or visa versa, such that the steering knuckle and/or other miscellaneous components can be replaced without the need for removal or replacement of the I-beam.

Preferred embodiments of this invention have been disclosed, however, a worker in this art would recognize that certain modifications would come within the scope of this invention. For that reason, the following claims should be studied to determine the true scope and content of this invention.

What is claimed is:

1. A steering system comprising:
    a steering knuckle for mounting a wheel, and having upper and lower spaced bosses;
    a kingpin mounted within said upper and lower spaced bosses;
    an I-beam mounted between said upper and lower spaced bosses and on said kingpin, said I-beam having a spring pad, said spring pad being for mounting or fixing said I-beam to a chassis of a vehicle, and there being a desired distance between said spring pad and a rotational axis of a wheel mounted on said knuckle; and
    said lower boss being adjustable relative to said axis to achieve said desired distance.

2. A steering system as recited in claim 1, wherein said lower boss is adjustably mounted on a lower flange of said steering knuckle.

3. A steering system as recited in claim 2, wherein said lower boss is welded to said flange after said adjustment.

4. A steering system as recited in claim 1, wherein said lower boss is connected by at least one removable attachment member to said flange.

5. A steering system as recited in claim 4, wherein a bolt is utilized to attach said lower boss to said steering knuckle.

6. A steering system as recited in claim 5, wherein said bolt passes through a hole in said flange which is machined into said flange at a desired position for properly locating said lower boss on said flange.

7. A steering system as recited in claim 5, wherein there are a plurality of bolt holes spaced along said flange such that one of said holes may be selected to achieve a desired lower boss position.

8. A steering system as recited in claim 5, wherein said bolt holes are slots such that said bolt can be moved within said slots to achieve adjustability in the position of said lower boss.

9. A steering system as recited in claim 1, wherein the location of said upper boss is also adjustable relative to said axis.

10. A steering system as recited in claim 9, wherein the location of said upper boss is adjusted to achieve a desired distance between a steering arm and said spring pad.

11. A steering system as recited in claim 1, wherein a filler material is positioned between said I-beam and said upper boss, and the thickness of said filler material is selected to fill a space between said I-beam and said upper boss as said lower boss is adjusted.

12. A method of servicing a steering assembly in a heavy vehicle comprising the steps of:

(1) mounting an I-beam and a kingpin within an upper and lower boss in a steering knuckle;

(2) removing one of said upper and lower bosses from said knuckle, thus exposing one end of said kingpin; and (3) then removing the other of said upper and lower bosses such that said knuckle is removed from said kingpin and said I-beam without the necessity of removing said kingpin from said I-beam.

13. A method of assembling a steering system in a vehicle comprising the steps of:

(1) providing a steering knuckle having at least one separate boss of an upper and lower boss, and providing an I-beam having a spring pad, said steering knuckle defining a rotational axis for a wheel;

(2) determining a desired distance between said axis and said spring pad;

(3) determining a desired position for said one separate boss to achieve said desired distance; and (4) then attaching said one separate boss to said steering knuckle at said desired position.

14. A method as set forth in claim 13, wherein a lower one of said bosses is separate.

15. A method as set forth in claim 14, wherein both said upper and lower bosses are separate from said steering knuckle, and said upper boss is positioned to achieve a desired distance between a steering arm and said spring pad.

* * * * *